United States Patent
Kajino et al.

[11] Patent Number: 5,872,625
[45] Date of Patent: Feb. 16, 1999

[54] APPARATUS FOR MEASURING AN OPTICAL CHARACTERISTIC OF AN EXAMINED LENS

[75] Inventors: Tadashi Kajino, Okazaki; Masanao Fujieda, Toyohashi; Yasumi Hikosaka, Gamagori; Tokio Ueno, Ichinomiya, all of Japan

[73] Assignee: Nidek Co., Ltd., Gamagori, Japan

[21] Appl. No.: 73,990

[22] Filed: May 7, 1998

[30] Foreign Application Priority Data

May 9, 1997 [JP] Japan ................................. 9-135887

[51] Int. Cl.⁶ .................................................. G01B 9/00
[52] U.S. Cl. ............................................ 356/124; 356/127
[58] Field of Search .................................. 356/124, 125, 356/126, 127, 359, 360, 374

[56] References Cited

U.S. PATENT DOCUMENTS

| | | |
|---|---|---|
| 4,459,027 | 7/1984 | Kafri et al. |
| 4,553,839 | 11/1985 | Kafri et al. |
| 4,569,590 | 2/1986 | Karny et al. |
| 4,590,681 | 5/1986 | Kafri et al. |
| 4,600,304 | 7/1986 | Kafri et al. |
| 4,614,039 | 9/1986 | Kafri et al. |
| 4,639,132 | 1/1987 | Glatt et al. |
| 4,722,605 | 2/1988 | Livnat et al. |
| 4,776,013 | 10/1988 | Kafri et al. |
| 4,810,895 | 3/1989 | Kafri et al. |
| 4,854,708 | 8/1989 | Kafri et al. |
| 5,046,843 | 9/1991 | Keren. |
| 5,173,739 | 12/1992 | Kurachi et al. ................. 356/124 |
| 5,355,210 | 10/1994 | Keren et al. |
| 5,521,700 | 5/1996 | Kajino et al. ................. 356/124 |
| 5,682,234 | 10/1997 | Kajino ................. 356/124 |

FOREIGN PATENT DOCUMENTS

| | | |
|---|---|---|
| A-60-17335 | 1/1985 | Japan. |
| 63-0208736 | 8/1988 | Japan ................. 356/124 |
| 6194266 | 7/1994 | Japan ................. 356/124 |
| A-8-304228 | 11/1996 | Japan. |

OTHER PUBLICATIONS

Yoshiharu Morimoto et al., "Application of moire analysis of strain using Fourier transform", Optical Engineering, Aug. 1988, vol. 27 No. 8, pp. 650–656.

Topcon, "Visual Lens Mapping 2000", catalog.

*Primary Examiner*—Hoa Q. Pham
*Attorney, Agent, or Firm*—Oliff & Berridge, PLC

[57] ABSTRACT

An apparatus for measuring an optical characteristic of an examined lens, comprising a first measuring optical system for projecting a first measuring light flux on an examined lens, which is enlarged so as to cover a relative large area of the lens, via both a first grating and a second grating which has a predetermined positional relationship with the first grating, thereby forming moire fringes thereon, then detecting the moire fringes by a two dimensional photo detector, a first calculating device for calculating each principle point refractive power at each point of the lens by processing results detected by the first measuring optical system, a second measuring optical system for projecting a second measuring light flux on a small area of the lens, then detecting a position of an image of the second measuring light flux by a positional photo-detector, a second calculating device for calculating a back vertex power at the small area by processing results detected by the second measuring optical system, and a display device for obtaining a distribution of each back vertex power at each point of the lens based on both the back vertex power and the each principle point refractive power, then displaying it graphically.

19 Claims, 8 Drawing Sheets

APPARATUS FOR MEASURING AN OPTICAL CHARACTERISTIC OF AN EXAMINED LENS

BACKGROUND OF THE INVENTION

1. Field of the Invention

The present invention relates to an apparatus for measuring an optical characteristic of an examined lens, which is utilized for estimating an optical characteristic of a lens such as a progressive focus lens and the like.

2. Description of Related Art

In conventional art, there is known a lens meter which projects a light flux for measurement to an examined lens, then detects a locus of a penetration of light by using a photo-detector, thereby enabling to measure an optical characteristic of the lens on the basis of detected results. The measurement is performed by way of locating a measuring point of a lens on a measuring optical axis, then obtaining a back vertex power thereof However, in case of obtaining a distribution of each back vertex power at each point of an examined lens of which a power changes on a simple lens, such as a progressive focus lens and the like, the above mentioned apparatus causes trouble to measure. That is, the measurement should be performed repeatedly corresponding to a number of numerous measuring points, further, the measured numerous data should be recorded and analyzed with making them correspond to respective measuring points. Accordingly, it results in such disadvantages that it takes much time to perform measurement, and that measurement and analysis of data are remarkably trouble. Further, it is difficult for recording each measuring point corresponding to each measured result, thus tending to be inaccurate.

On the other hand, there is known an apparatus acting on so-called a moire topography. The apparatus projects a light on an examined lens, thereby causing moire fringes to be formed thereon, then analyzing the moire fringes, thereby obtaining a distribution of a principle point refractive power at each measuring point of the examined lens. However, the common moire topography does not allow the apparatus to obtain a distribution of a back vertex power which is defined as a refractive power of a spectacle lens, because the moire topography allows the apparatus to obtain a distribution of a principle point refractive power at each measuring point. In case of obtaining a distribution of each back vertex power at each measuring point by using an apparatus acting on an above mentioned moire topography, for which it is necessary to obtain a central thickness of the examined lens and a curvature of a minus surface. If measurement is performed in order to obtain these data prior to measure with acting on the moire topography, then a distribution of each back vertex power at each measuring point can be obtained. However, if the measuring mechanism therefor is additionally provided for the apparatus, then the apparatus may be large-sized, thus resulting in that it takes much time to perform measurement.

Further, the conventional measuring apparatus acting on the moire topography can not measure an amount of prism of the examined lens, therefore, it is not capable of judging an optical center of the examined lens.

SUMMARY OF THE INVENTION

The present invention has been made in view of the above circumstances and has an object to overcome the above problems and to provide an apparatus for measuring a lens characteristic, which can measure accurately and quickly a distribution of each back vertex power at each point of a lens based on each principle point refractive power at each point of the lens and a back vertex power at a specified point of the lens.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the present invention, as embodied and broadly described herein, an apparatus for measuring an optical characteristic of an examined lens, comprises a first measuring optical system for projecting a first measuring light flux on an examined lens, which is enlarged so as to cover a relative large area of the lens, via both a first grating and a second grating which has a predetermined positional relationship with the first grating, thereby forming moire fringes thereon, then detecting the moire fringes by a two dimensional photo detector, first calculating means for calculating each principle point refractive power at each point of the lens by processing results detected by the first measuring optical system, a second measuring optical system for projecting a second measuring light flux on a small area of the lens, then detecting a position of an image of the second measuring light flux by a positional photo-detector, second calculating means for calculating a back vertex power at the small area by processing results detected by the second measuring optical system, and display means for obtaining a distribution of each back vertex power at each point of the lens based on both the back vertex power and the each principle point refractive power, then displaying the distribution graphically.

Another aspect of present invention, an apparatus for measuring an optical characteristic of an examined lens, comprises a measuring optical system for projecting a measuring light flux on an examined lens, which is enlarged so as to cover a relative large area of the lens, via both a first grating and a second grating which has a predetermined positional relationship with the first grating, thereby forming moire fringes thereon, then detecting the moire fringes by a two dimensional photo detector, calculating means for calculating each principle point refractive power at each point of the lens by processing results detected by the measuring optical system, input means for inputting a back vertex power at a certain point of the lens, and display means for obtaining a distribution of each back vertex power at each point of the lens based on both the back vertex power and the each principle point refractive power, then displaying the distribution graphically.

According to the present invention, a distribution of each back vertex power at each point of the lens can be measured rapidly and accurately based on each principle point refractive power at each point of the lens and a back vertex power at a certain specified point of the lens.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
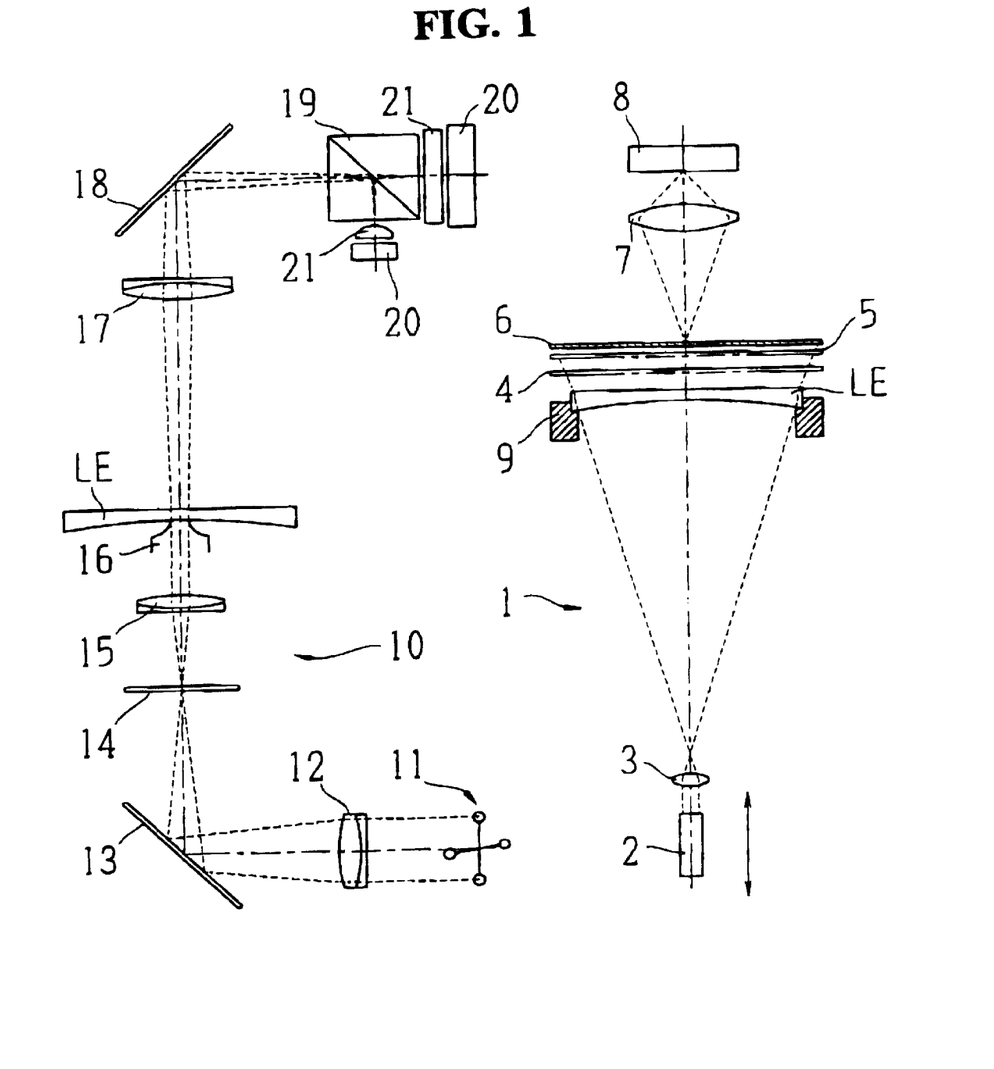
FIG. 1 is a view showing a schematic arrangement of an optical system of an apparatus according to the preferred embodiment of the present invention.

A detailed description of one preferred embodiment of an ophthalmic apparatus embodying the present invention will now be given referring to the accompanying drawings. FIG. 1 is a view showing a schematic arrangement of an optical system of the apparatus. The apparatus includes a first measuring optical system 1 which measures a distribution of each principle point refractive power at each point of the examined lens and a second measuring optical system 10 which measures a back vertex power at a certain measuring point of the lens. The first measuring optical system 1 and the second measuring optical system 10 may be constructed in a body, alternatively they may be separated.

[The first measuring optical system]

The first measuring optical system 1 consists of a semiconductor laser source 2 for measurement, an objective lens 3, a first grating 4 which has lattice lines spaced at a predetermined pitch, a second grating 5 which has lattice lines spaced at a predetermined pitch, being disposed apart from the first grating 4 at a predetermined distance, a screen 6 for observing moire fringes, a photographing lens 7, and a CCD camera 8. The lens LE is positioned by a holder 9 at a predetermined standard position. The holder 9 is configured so as to regulate a space in accordance with a size of the lens LE. Besides, both the light source 2 and the objective lens 3 can be moved by a below mentioned moving device in a direction of an optical axis. In addition, the first grating 4 and the second grating 5 are disposed so that lattice lines may be inclined to each other at a predetermined fine angle relatively, which are configured so as to rotate together by a below mentioned rotation device.

Light from the light source 2 is converged by the objective lens 3, then diverges, thus illuminating a predetermined range of the lens LE uniformly, penetrating the lens LE. The penetrating light is refracted in accordance with a distribution of a refractive power of the lens LE, thereby illuminating the first and second gratings 4 and 5 in order, thus causing respective lattice lines of gratings 4 and 5 to be projected onto the screen 6, resulting in forming moire fringes thereon. An angle of an inclination of each moire fringe on the screen 6 changes in response to movement of the light source 2 and the objective lens 3. Each moire fringe on the screen 6 forms an image on a surface of a photographing element of the CCD camera 8 by the photographing lens 7.

Next, a method for obtaining a distribution of each principle power at each points and that of each back vertex power thereat of the lens will be described below.

Figure 2:
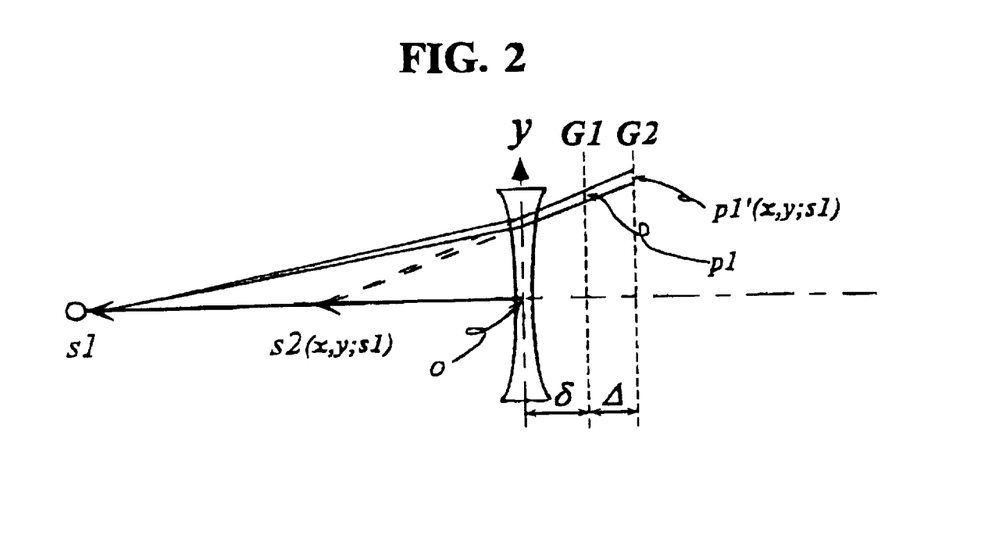
FIG. 2 is a view for illustrating a method for analyzing moire fringes.

When light from the light source 2 passed through the lens LE illuminates the first grating 4, then a shadow of lattice lines of a pitch p1 of the first grating 4 is projected on the second grating 5, and becomes a pitch p1 (x,y;s1), thus causing moire fringes to be generated by a superposition of the pitch p1(x,y;s1) and lattice lines of a pitch p2 (>p1) of the second grating 5. As shown in FIG. 2, a relationship between the pitch p1 and the pitch p1' can be given by following expression (1) in a manner of a paraxial approximation, based on a refractive power of the lens LE, a position of the light source, a distance Δ from a first grating 4 (G1) to a second grating 5 (G2), and a distance δ from the lens LE to the first grating 4 (G1).

$$p1'(x, y; s1) = \left(1 - \frac{\Delta}{\frac{1}{\frac{D_{p,p1}(x, y)}{1000} + \frac{1}{s1}} - \delta}\right) \cdot p1 \quad (1)$$

Where, s1 is defined as a distance from a standard position O of the lens LE to a position of the light source (from the light source 2 to a position at which light is converged by the objective lens 3), s2 is defined as a distance from the standard position O to a position of an image point by the lens LE, and $D_{p,p1}(x,y)$ is defined as a refractive power in a direction perpendicular to lattice lines of the first grating 4.

Figure 3:
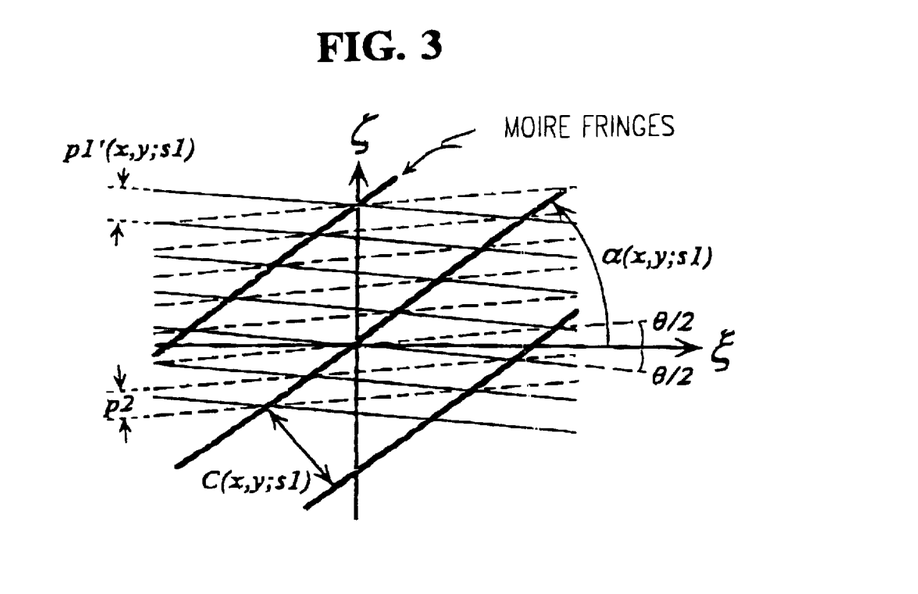
FIG. 3 is a view for illustrating a method for analyzing moire fringes.

Next, a detail of moire fringes will be described below. As shown in FIG. 3, if it is defined that lattice lines of the first grating 4 and that of the second grating 5 are disposed so as to be inclined to each other at a predetermined fine angle θ relatively, then an angle α (x,y;s1) of a moire fringe (a moire fringe's angle to a line ξ which bisects each lattice line of the gratings 4 and 5 and a space C(x,y;sl) therebetween are given by following expressions (2) and (3).

$$\tan\alpha(x, y; s1) = \left(\frac{p1'(x, y; s1) + p2}{p1'(x, y; s1) - p2}\right) \cdot \tan\frac{\theta}{2} \quad (2)$$

$$C(x, y; s1) = \frac{p1'(x, y; s1) \cdot p2}{\sqrt{p1'(x, y; s1)^2 + p2^2 - 2p1'(x, y; s1) \cdot p2 \cdot \cos\theta}} \quad (3)$$

$$= \frac{1}{\sqrt{\frac{1}{p1'(x, y; s1)^2} + \frac{1}{p2^2} - \frac{2\cos\theta}{p1'(x, y; s1) \cdot p2}}}$$

Referring to the expressions (2) and (3), in case of p1'=p2, moire fringes become perpendicular to the line ξ which bisects each lattice line of the gratings 4 and 5, and a space C(x,y;s1) therebetween becomes maximum. In this case, a relationship an angle θ of a moire fringe and a space $C_{max}$ is given by following expression (4).

$$C_{max} = \frac{p2}{2\sin\frac{\theta}{2}} \equiv \frac{p2}{\theta} \text{ when } p1'(x, y; s1) = p2 \quad (4)$$

Accordingly, an equation for a refractive power $D_{p,p1}(x,y)$ which is obtained by defining the expression (1) as p1'=p2 is given by following expression (5).

$$D_{p,p1}(x, y) = \frac{1000}{\frac{\Delta}{1 - \frac{p2}{p1}} + \delta} - \frac{1000}{s1} \quad (5)$$

If the position of the light source, under the condition that moire fringes change from a condition shown in FIG. 3 to a condition being perpendicular to the lens LE, is substituted for expression (5), then a refractive power $D_{p,p1}(x,y)$ at its point (a standard position) can be calculated.

If each refractive power of the lens LE is fixed all over the surface, then moire fringes become fringe lines every spaced perpendicularly. Therefore, if an amount of deviation of space of moire fringes at another point is calculated acting on a space frequency analysis (see OPTICAL ENGINEERING/August 1988/ vol. 27 No. 8, page 650–page 656) with respect to a space of moire fringes at a standard point being perpendicular fringe lines is calculated, then relative refractive power at a measured periphery is calculated based on the refractive power $D_{p,p1}(x,y)$ at the standard point.

Strictly, the refractive power $D_{p,p1}(x,y)$ is a factor in a direction perpendicular to lattice lines of the first grating 4. However, in case that θ is small enough, $D_{p,p1}(x,y)$ can be considered as a factor perpendicular to ξ-axis (in other word, parallel to ζ -axis), that is, as $D_{p,\zeta}(x,y)$, with satisfying accuracy. In addition, if $D_{p,p1}(x,y)$ is defined as a factor $D_{p,y}(x,y)$ of a refractive power in a direction of y-axis under the condition that y-axis of a detecting surface of moire fringes coincides with ζ-axis, then a factor of a refractive power in a direction of x-axis perpendicular to above mentioned direction, that is $D_{p,x}(x,y)$, can be calculated by causing the gratings 4 and 5 to rotate 90° together, as well as causing ζ and θ axis to rotate together. And, a principle point refractive power $D_p(x,y)$ can be calculated by following expression (6).

$$D_p(x, y) = \sqrt{D^2_{p,x}(x, y) + D^2_{p,y}(x, y)} \quad (6)$$

Therefore, each principle point refractive power $D_p(x,y)$ for numerous points is calculated by using the expression (6), thereby a distribution of each principle point refractive power at each point can be obtained.

In addition, a refractive power of a spectacle lens is defined as a back vertex power, therefore, it is necessary to convert a principle point refractive power calculated by the expression (6) to a back vertex power. Firstly, a principle point refractive power at each point is converted to a focal length being a reciprocal. Next, a difference between any point given by below mentioned second measuring optical system 10 and a reciprocal of a back vertex power of the lens is calculated, then subtracting the value from a focal length at each point, then calculating a reciprocal of each point once again, thereby obtaining a refractive power. Accordingly, a back vertex power which corresponds to a measurement of refractive power of a spectacle lens can be calculated.

[The second measuring optical system]

Numeral 11s are light sources for measurement, such as LED and the like, which are four in number and disposed perpendicular to an optical axis close to a focal point of the objective lens 12. They are configured so as to be lit up in order. Numeral 13 is a mirror. Numeral 14 is a target plate having a slit which intersects at right angles, which is disposed close to each focal point of an objective lens 12 and a collimating lens 15 respectively so as to be fixed or to be movable. Numeral 16 is a nosepiece for putting the lens LE thereon, which is disposed close to each focal point of the collimating lens 15 and a focusing lens 17 respectively. Numeral 18 is a mirror. Numeral 19 is a half prism. Numerals 20s are two image sensors which are disposed at a plane intersecting with the optical axis at right angles and disposed so that the detecting directions thereof intersect at right angles each other. Numerals 21s are two cylindrical lenses, and the image sensors 20s are disposed at each strong principle meridian focal point. Light from the light source 11 for measurement illuminates the target plate 14 via the objective lens 12 and the mirror 13. Light flux via the target plate 14 passes through the collimating lens 15, the nose piece 16, the lens LE, the focusing lens 17, the mirror 18, the half prism 19 and the cylindrical lens 21, thereby forming respective images on two image sensors 20s respectively.

Figure 4:
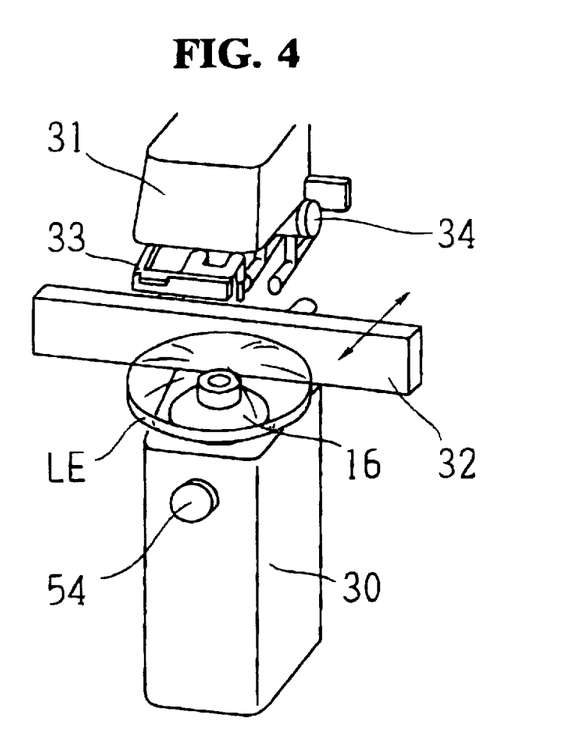
FIG. 4 is an external view showing a part of a case which holds a second measuring optical system.

FIG. 4 is an external view showing a part of a case which holds a second measuring optical system 10. The holding part 30 holds the light source 11, the objective lens 12, the mirror 13, the target plate 14 and the collimating lens 15, and the holding part 31 holds the focusing lens 17, the mirror 18, the half prism 19, the image sensors 20s and the cylindrical lens 21. Numeral 32 is a lens receiver which is supported so as to be movable in the forward and backward directions relative to the apparatus. Numeral 33 is a lens fixer. By pushing the lens fixer 33 down, the lens LE is supported by the nose piece 16 and the lens fixer 33. Numeral 34 is a marking device which is capable of making with three marks parallel to the lens receiver 32, and is configured so that the center mark thereof is marked at the center of the nose piece 16. The marking operation is performed by operating a lever which is not shown.

Next, a measurement of a back vertex power at a certain measuring point performed by above mentioned second measuring optical system 1 will be described below. In accordance with turning on each light source 11 for measurement in order, the target plate 14 is illuminated respectively. In case that the lens LE does not exist, respective target images formed on respective image sensors 20s are superposed altogether. In case that the lens LE has only a spherical power, a position of the target image on the image sensor moves in accordance with the spherical power. In the case that the lens LE has only a cylinder power, parallel light flux penetrating the cylindrical lens 21 is only effected by the cylinder power acting upon a direction intersecting at right angles with a strong principle meridian (or the same direction). Therefore, based on the center coordinates of the target image appeared by turning each light source 11 for measurement, the spherical power, the cylinder power, the cylinder axis and the amount of prism are can be calculated. The method for calculating them is basically the same as Japanese Patent Laid-Open SHO60-17335.

Figure 10A:
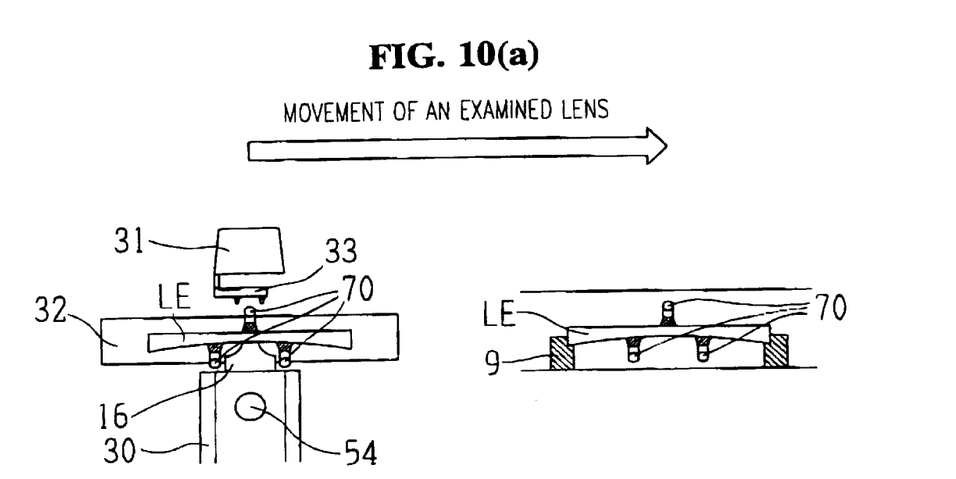
FIGS. 10(a) and (b) are views for illustrating a mechanism for moving an examined lens.
Figure 10B:
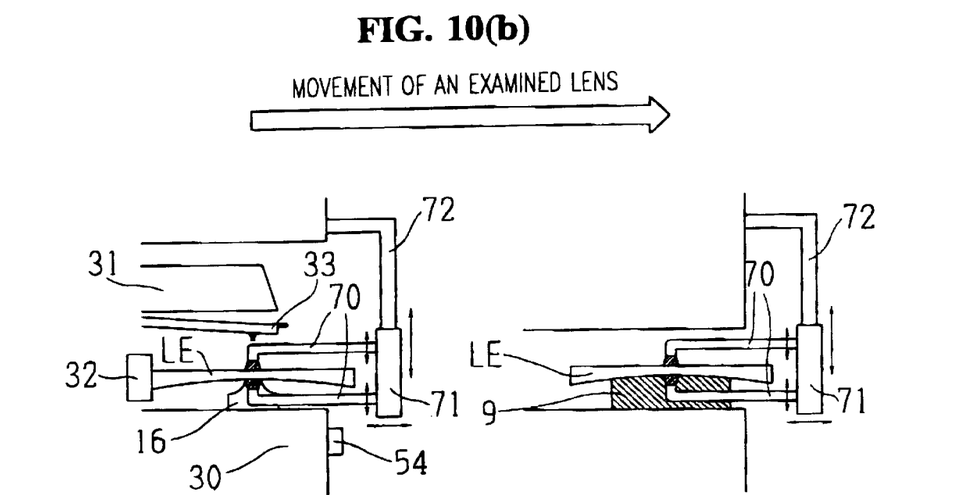
Figure 11:
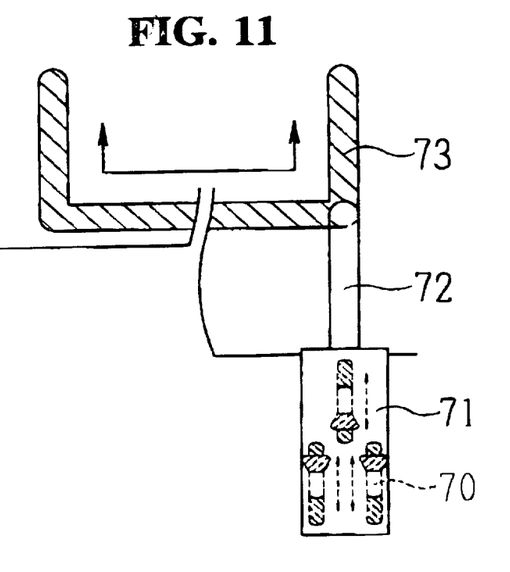
FIG. 11 is a view for illustrating a mechanism for moving an examined lens.
Figure 12:
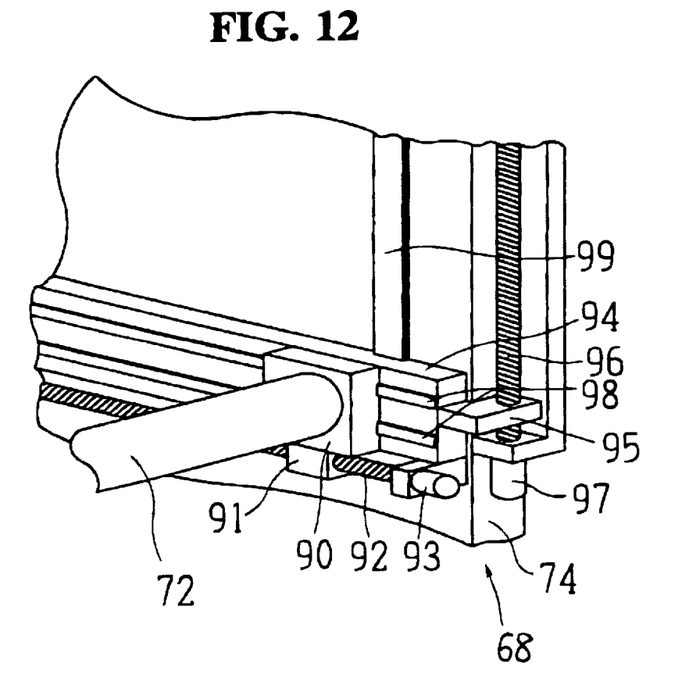
FIG. 12 is a view for illustrating a mechanism for moving an examined lens.

FIGS. 10(a) and (b), FIG. 11 and FIG. 12 are views for illustrating a mechanism for moving the examined lens from the second measuring optical system 10 to the first measuring optical system 1. FIG. 10(a) is a front view, and FIG. 10(b) is a side view. A lens moving part 71 has three arms 70s which hold a lens, which is supported from the main body by a holding part 72. The three arms 70s are movable in a vertical direction respectively, thereby allowing the lens LE to be held therebetween. The holding part 72 is fixed to a lateral slide base 90 of a lens moving device 68 provided for inside of the main body via a channel bar 73 (see FIG. 11). If a ball-screw 92 is rotated by a pulse motor 93, then a nut block 91 being screwed on a ball screw 92 moves, thus causing the lateral slide base 90 to slide in a lateral direction along two guide rails 98s fixed to the front of a vertical slide base 94. In addition, if a ball-screw 96 is rotated by a pulse motor 97, then a nut block 95 being screwed on a ball screw 96 moves, thus causing the vertical slide base 94 to slide in a vertical direction along two guide rails 99s (in figure, there is shown only one in convenience for drawing) fixed to the front of a back and front slide base 74 (see FIG. 12). Further, the back and front slide base 74 is also made to slide in forward and backward directions by the same mechanism as mentioned above (not shown in figure) Utilizing such moving mechanism, if the measurement of the lens LE is finished by the second measuring optical system 10, then it is capable moving the lens LE from the nose piece 16 of the second measuring optical system 10 to a predetermined standard position (a position on the holder 9) of the first measuring optical system 1. Besides, if the lens LE is made to move to the predetermined position of the first measuring optical system 1, then the arms 70s release the lens and moving aside, thus causing the measurement not to be disturbed.

[The control system]

Figure 5:
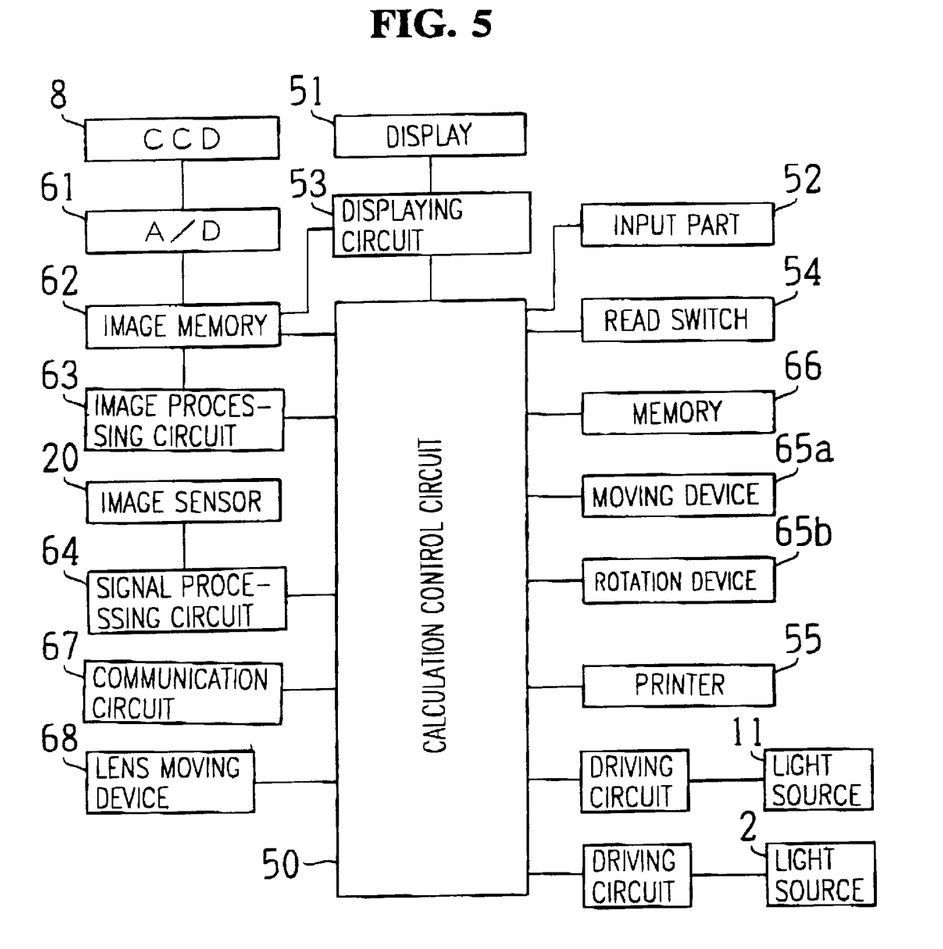
FIG. 5 is a block diagram of a control system of the preferred embodiment of the present invention.

FIG. 5 is a block diagram of a control system. Numeral 50 is a calculation control circuit which controls each device, and performs the calculation process of measurement performed by the first and second measuring optical systems 1 and 10. Numeral 51 is a display which can display with color. The display 51 displays a target for alignment and the measured results of the second measuring optical system 10, a color map of a distribution of each back vertex power at each point of the lens LE by the first and second measuring optical systems 1 and 10, as well as several kinds of information. Numeral 52 is an input part which includes several kinds of switches which is utilized for instructing each device. The switches of the input part 52 are arranged at positions corresponding to the switch-display displayed on a predetermined position. In accordance with each switch-display under each displaying mode, each switch is made to have each function, thereby allowing various kinds of instructions to be made with low number of switches. Numeral 53 is a displaying circuit of the display 51.

Image signal of moire fringes from the CCD camera B is converted to a digital signal, then is captured by an image memory 62. The captured image data is processed by an image processing circuit 63, and the calculation control circuit 50 calculates data obtained by above mentioned measurement in order to obtain the measured results concerning a refractive power. The calculation control circuit 50 is connected to a signal processing circuit 64 which gives a predetermined process to a signal from the each image sensor 20, a moving device 65a which causes the light source 2 and the objective lens 3 to move in a direction of an optical axis, a rotation device 65b which rotates the first and second gratings 4 and 5, a memory 66 which stores the measured information or the like, a lens moving device 68 which causes the lens LE to move from the first measuring optical system 1 to the second measuring optical system 10, a READ switch 54 which is utilized for reading the measured values of the lens LE during measurement by the second measuring optical system 10, a printer 55 which prints out the measured results and the like. Numeral 67 is a communication circuit which is utilized for sending data to other devices and for receiving the same therefrom Next, the operation of the apparatus of the present invention having such architecture will be described below.

[The measurement of the progressive focus lens]

Figure 6:
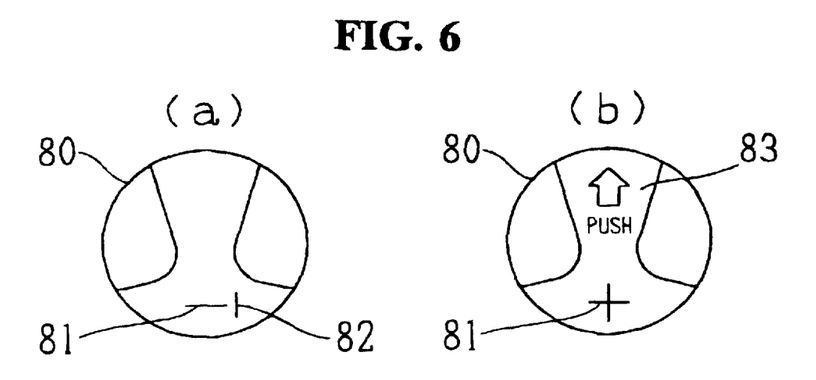
FIG. 6 is a view showing an example of a display in case of measuring a far viewing section of a progressive focus lens.

Firstly, by using a measuring-mode switch of the input part 52a, measuring mode of the apparatus is made to be a measuring mode for a progressive focus lens, in which the measurement is performed by the second measuring optical system 10. On the display 51, as shown in FIG. 6(a), an alignment circle 80 having two curves simulating a progressive focus lens and a guide 81. The examiner puts the far viewing section of the progressive focus lens on the nose piece 16. Upon locating the lens on the measuring optical axis, a progressive target 82 is displayed on either the right side or the left side of the guide 81 in the alignment circle 80. The calculation control circuit 50 calculates a relative position of the progressive target 82 relative to the guide 81 based on the prism value at each measuring point, thereby controlling the position.

When the progressive target 82 is superposed on the center of the guide 81 by the lateral motion of the lens LE, as shown in FIG. 6(b), a guidance display mark 83 of "PUSH↑" meaning that the lens is to be moved toward a deep side of the apparatus. The examiner moves the lens in accordance with the guidance display. The apparatus obtains the measured values continuously in a predetermined interval, if there is no variation in the additive diopter (spherical power) in accordance with the movement, then the apparatus displays the guide 81 in a large cross shape, thereby informing the examiner that the measuring point is in the far viewing section. When depressing the READ switch 54, the measured values, such as the spherical power, the cylinder power and the cylinder axis, are stored into the memory 66.

On measuring a distribution of each refractive power, the examiner marks the measuring point (where the READ switch 54 is depressed) of the far viewing section with the mark by using the marking device 34. After completion of the marking operation, the measurement by the first measuring optical system 1 may be performed, or alternatively, in succession, the measurement of a near viewing section may be performed to obtain an additive diopter. Concerning the measurement of the near viewing section is described in Japanese Patent Laid-open HEI9-43101 corresponding to U.S. Pat. No. 5,682,234 filed by the applicant of the present invention.

Besides, by marking the lens with the mark-points, the position of the measuring point, which is defined as a standard for measuring a distribution of a refractive power, is obtained, therefore, the measurement by the second measuring optical system 10 can be performed at any position. However, in case of the progressive focus lens, it is the far viewing section that a refractive power is the most stable, therefore, more accurate results can be obtained by measuring the far viewing section than the near viewing section, as described above.

Next, the measurement performed by the first measuring optical system 1 will be described below. The examiner operates the measuring mode switch, thereby causing the mode to change to the measuring mode of a progressive lens by the first measuring optical system 1. Then, the examiner operates the apparatus so that the lens LE is positioned on the optical axis of the first measuring optical system 1 by the lens moving device 68. Then, the lens is put on the holder 9 so as to be set at the standard position. On the display 51, an image of moire fringes, photographed by the CCD camera 8, is displayed.

After completion of setting the lens, the measurement is started by depressing the starting switch for measurement of the input part 52. The calculation control circuit 50 controls the moving device 65a so that the moire fringes at the center of the optical axis may be perpendicular to x-axis of x-y plane of the apparatus, thus causing the position of the light source 11 to be moved. When the moire fringes at the center of the optical axis have the predetermined relationship, the image thereat from the CCD camera 8 is stored into the image memory 62. After that, the calculation control circuit 50 extracts the central marking position marked on the lens LE based on the images stored by the image memory 62, then obtains the position of the standard measuring point corresponding to the measured powers which are stored by the memory 66. In succession, based on the powers at the standard measuring point, such as the spherical power and the cylinder power, and the image analysis of the moire fringes, a distribution data, such as a distribution data of the spherical power and that of the cylinder power, of each back vertex power at each point is obtained in a manner of above mentioned method.

Besides, unless the power at any standard measuring point is not given in advance, an information of a relative distribution of a refractive power can be obtained. Therefore, alternatively, it may be performed by judging the far viewing section automatically from the information, then fitting the power information of the far viewing section of the lens, which is stored in the memory 66, to the judged far viewing section, thus resulting in that a distribution data of each back vertex power at each point may be calculated. In this case, it is not necessary to mark and to extract the marking point.

In addition, if the measuring point of the power of the lens LE is designated on the display 51 where the moire fringes are displayed, then it can be omitted to mark and to extract the marking point.

Figure 7:
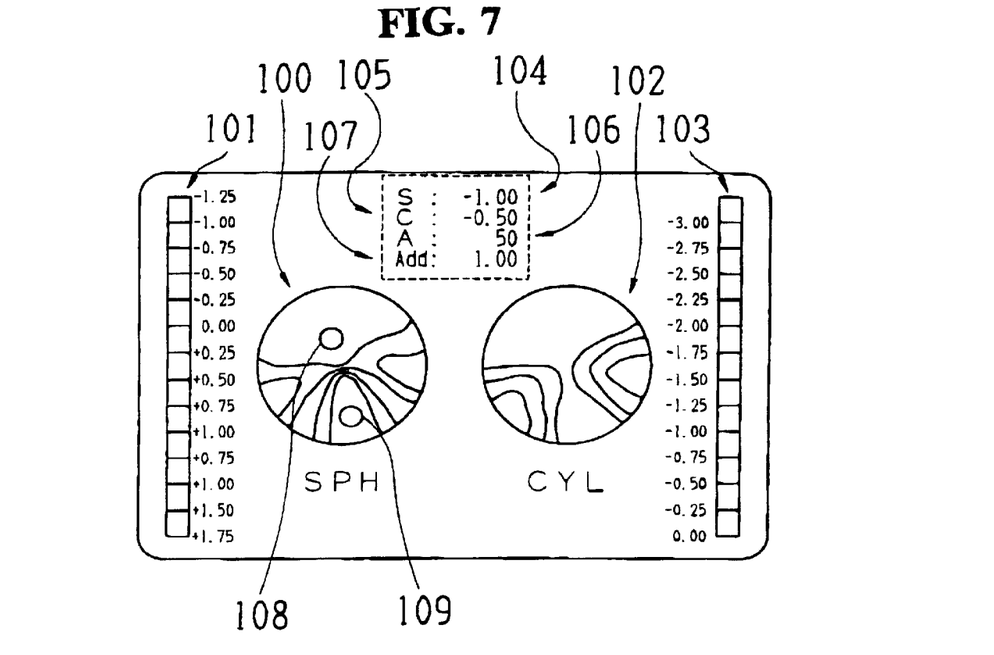
FIG. 7 is a view showing an example of a display of a color map of a power distribution.

When the measurement of a distribution of each back vertex power at each point, each power distribution is displayed on the display 51 by a color map. FIG. 7 is a view showing an example thereof. On a circle 100 at the left side, a color map of a spherical power distribution is displayed, and on a color bar 101, a classification of colors of spherical powers is displayed. On a circle 102 at the right side, a color map of a cylinder power distribution is displayed, and on a color bar 103, a classification of colors of cylinder powers is displayed. A power step for classifying colors can be changed to any steps such as 0.12D, 0.25 or 0.50D.

Also, on the display 51, a spherical power 104, a cylinder power 105, and a cylinder axis 106 of the far viewing section, and an additive diopter 107 of the near viewing section, that are judged on the basis of a distribution information, are displayed on the display 51. In addition, alternatively, the measuring values stored in the memory 66 may be displayed thereon as to each measuring value of the far viewing section (or the near viewing section)

Further, the measuring position of the displayed powers of the far viewing section, such as the spherical power 104, the cylinder power 105 and the cylinder axis 106 ,can be made to be displayed on the color map as a mark 108, and that of the near viewing section, such as the additive diopter 107, can be made to be displayed on the color map as a mark 109 (the marks 108 and 109 are displayed within a predetermined range in size). In this case, the examiner can change the position and the size of the marks 108 and 109. If the position and the size of the marks 108 and 109 are changed, then each measuring value of far and near viewing sections is recalculated, thereby allowing the display to be renewed. In addition, the average value within a predetermined range (changed range) is applied as the spherical power 104, the cylinder power 105, the cylinder axis 106 and the additive diopter.

Referring to such map information, condition of a distribution of each back vertex power at each point of the lens and that of a progressive band. Also, it is utilized for judging a type of a progressive lens of which the manufacturer is not known, accordingly, the optician's shop can provide the user the progressive focus lens of the same type.

Figure 8:
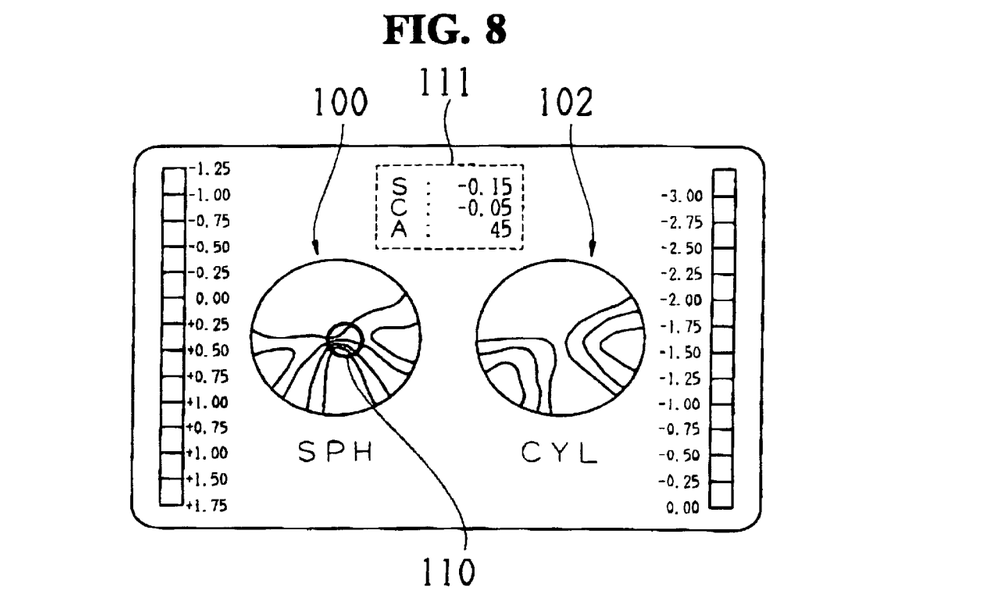
FIG. 8 is a view showing an example of a display of an averaged distribution within a designated range.

In addition, by designating a predetermined range (or point) on the color map, then a spherical power, a cylinder power and a cylinder axis within the designated range can be made to be calculated and to be displayed. If depressing the switch of the input part 52 for designating a range, which is not shown, then a mark 110 utilized for designating a range appears on the color map (see FIG. 8). The mark 110 is moved to a desired position by using the switch of the input part 52 (or a mouse), then the size of the range is changed. The mark 110 is movable on the circles 100 and 102, and the calculation control circuit 50 calculates each average value of spherical powers, cylinder powers and cylinder axes respectively within the range, based on the size of the mark 110 on the display, then displays results on a display 111. Alternatively, if a desired point is designated on a color map, then the power thereat can be also displayed thereon.

[The measurement of a simple focus lens]

Figure 9:
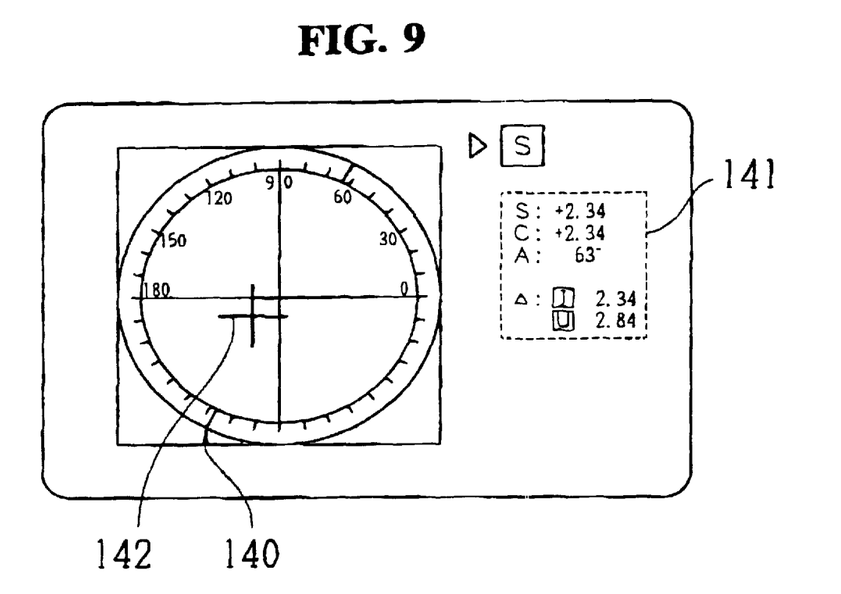
FIG. 9 is a view showing an example of a display in case of measuring a simple focus lens.

The measurement mode of the apparatus is changed to that of the simple focus lens measured by the second measuring optical system 10, then the measurement is performed by the optical system 10. In order to display a color map of a distribution of each back vertex power, it is allowed to measure at random position, alternatively, it may be measured at an optical center. In case of measuring at the optical center, an alignment is performed so that a reticle 140 may coincide with a cross target 142 as shown in FIG. 9. If the READ switch 54 is depressed, then the measuring value is stored. When the measurement is completed, the position is marked with the marking point. Next, the measurement mode is change to that of a simple focus mode measured by the first measuring optical system 1, then the lens LE is moved to the first measuring optical system 1, and the measurement is carried out as the same way as a progressive focus lens. Thereby, a color map is displayed on the display 51. In case of a simple lens, if the step width for classifying colors is set small, then varying condition of power comes to appear.

In addition, above mentioned apparatus of the preferred embodiment is configured so as to be provided with the first measuring optical system 1 which is utilized for obtaining a principle point refractive power and the second measuring optical system 10 which is utilized for obtaining a back vertex power at a certain specified position (a small area) of the lens LE, thereby measuring the lens firstly by using the second measuring optical system 10, then measuring the same by using the first measuring optical system 1, thus calculating a distribution of each back vertex power at each point of the lens based on both measuring data However, alternatively, the main apparatus may be configured so as to be provided with only an optical system utilized for calculating each principle point refractive power at each point of the lens. In this case, an optical system utilized for calculating a back vertex power at a certain specified point of the lens is provided for another apparatus by which the lens is measured. Then, by inputting the measured data to the main apparatus, a distribution of each back vertex power at each point of the lens can be calculated. The data input from the another apparatus to the main apparatus may be performed as follows. That is, the data can be inputted to the memory 66 by a data communication or an operation of switches. In this case, a device utilized for a data communication or a device utilized for operating switches is provided for at least one apparatus or for both apparatuses.

In case of inputting the measuring data from another apparatus to the main apparatus by operating switches, upon starting or stopping the measurement performed by the main apparatus, a message "input the measuring data from another apparatus" is made to be displayed on the display 51. On the contrary, in case of inputting the measuring data from another apparatus to the main apparatus by a data communication, when another apparatus completes the measurement, then the measuring data is automatically inputted to the main apparatus. The main apparatus calculates a distribution of each back vertex power at each point of the lens based on the received measuring data and the data measured by the main apparatus after receiving. Alternatively, the main apparatus may be configured so as to judge whether the measuring data is inputted from another apparatus upon starting or stopping the measurement, then to require another apparatus to send the measuring data in case of being judged that the data is not inputted. Further, by numbering each measuring data sent by another apparatus (or inputted by using switches) for administration, thereby it may be allowed that each numbered data is checked with the lens which is to be measured by the main apparatus. Accordingly, after inputting the measuring data of a plurality of lenses to the main apparatus, these lenses can be measured irrespective of order. Besides, as described above, the measuring position of another apparatus can be obtained by performing an image processing under the condition that the marking point is marked.

In addition, the main apparatus is provided with a moving mechanism which is utilized for moving the lens, thereby the lens can be moved from the second measuring optical system 10 to the first measuring optical system 1 automatically, however, the moving mechanism may be omitted, and the examiner may moves the lens manually. In this case, the measuring position of the second measuring optical system 10 can be also obtained by performing an image processing under the condition that the marking point is marked.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for measuring an optical characteristic of an examined lens, comprising:
    a first measuring optical system for projecting a first measuring light flux on an examined lens, which is enlarged so as to cover a relative large area of the lens, via both a first grating and a second grating which has a predetermined positional relationship with said first grating, thereby forming moire fringes thereon, then detecting said moire fringes by a two dimensional photo detector;
    first calculating means for calculating each principle point refractive power at each point of the lens by processing results detected by said first measuring optical system;
    a second measuring optical system for projecting a second measuring light flux on a small area of the lens, then detecting a position of an image of said second measuring light flux by a positional photo-detector;
    second calculating means for calculating a back vertex power at said small area by processing results detected by said second measuring optical system; and
    display means for obtaining a distribution of each back vertex power at each point of the lens based on both said back vertex power and said each principle point refractive power, then displaying the distribution graphically.

2. The apparatus for measuring an optical characteristic of an examined lens according to claim 1, further comprising:
    alignment means for aligning said second measuring optical system with the lens;
    wherein said alignment means comprising:
    calculating means for calculating an amount of prism based on results detected by said second measuring optical system; and
    display means for displaying an alignment condition based on the calculated amount of prism.

3. The apparatus for measuring an optical characteristic of an examined lens according to claim 1, further comprising:
    alignment means for aligning said second measuring optical system with the lens;
    signal generating means for making said second measuring optical system go into run under the condition being aligned by said alignment means; and
    specifying means for specifying a measuring position of the lens by said second measuring optical system by way of making the results calculated by said first calculating means correspond with the alignment information by said alignment means.

4. The apparatus for measuring an optical characteristic of an examined lens according to claim 1, further comprising:
    sensing means for sensing a marked position of the lens, which indicates a measuring position by said second measuring optical system, based on results detected by said first measuring optical system.

5. The apparatus for measuring an optical characteristic of an examined lens according to claim 1, further comprising:
    designating means for designating a desired range of the lens; and
    calculating means for calculating an averaged power within the range designated by said designating means based on said distribution of each back vertex power.

6. The apparatus for measuring an optical characteristic of an examined lens according to claim 5,
    wherein said designating means designates the desired range of the lens by means of a mark displayed by said display means; and
    said averaged power calculated by said calculating means is displayed on said display means.

7. The apparatus for measuring an optical characteristic of an examined lens according to claim 5, wherein size of the desired range which is designated by said designating means is variable.

8. The apparatus for measuring an optical characteristic of an examined lens according to claim 5, wherein said designating means judges each position of a far viewing section and a near viewing section of a progressive multi focus lens based on said distribution of each back vertex power, whereby designating a predetermined range at said judged each position of a far viewing section and a near viewing section.

9. The apparatus for measuring an optical characteristic of an examined lens according to claim 8, wherein said predetermined range at said designated each position of a far viewing section and a near viewing section is displayed by said display means with marking; and
    said averaged power calculated by said calculating means is also displayed on said display means.

10. The apparatus for measuring an optical characteristic of an examined lens according to claim 1, wherein said display means displays a distribution of a spherical power and a cylinder power at each point of the lens in a manner of a color map.

11. The apparatus for measuring an optical characteristic of an examined lens according to claim 1, further comprising:

moving means for moving the lens between the predetermined position of said first measuring optical system and the predetermined position of said second measuring optical system.

12. An apparatus for measuring an optical characteristic of an examined lens, comprising:

a measuring optical system for projecting a measuring light flux on an examined lens, which is enlarged so as to cover a relative large area of the lens, via both a first grating and a second grating which has a predetermined positional relationship with said first grating, thereby forming moire fringes thereon, then detecting said moire fringes by a two dimensional photo detector;

calculating means for calculating each principle point refractive power at each point of the lens by processing results detected by said measuring optical system;

input means for inputting a back vertex power at a certain point of the lens; and display means for obtaining a distribution of each back vertex power at each point of the lens based on both said back vertex power and said each principle point refractive power, then displaying the distribution graphically.

13. The apparatus for measuring an optical characteristic of an examined lens according to claim 12, further comprising:

sensing means for sensing a marked position of the lens, which indicates a measuring position by said measuring optical system, based on results detected by said measuring optical system.

14. The apparatus for measuring an optical characteristic of an examined lens according to claim 12, further comprising;

designating means for designating a desired range of the lens; and calculating means for calculating an averaged power within the range designated by said designating means based on said distribution of each vertex power.

15. The apparatus for measuring an optical characteristic of an examined lens according to claim 14, wherein said designating means designates the desired range of the lens by means of a mark displayed by said display means; and said averaged power calculated by said calculating means is displayed on said display means.

16. The apparatus for measuring an optical characteristic of an examined lens according to claim 14, wherein size of the desired range which is designated by said designating means is variable.

17. The apparatus for measuring an optical characteristic of an examined lens according to claim 14, wherein said designating means judges each position of a far viewing section and a near viewing section of a progressive multi focus lens based on said distribution of each back vertex power, whereby designating a predetermined range at said judged each position of a far viewing section and a near viewing section.

18. The apparatus for measuring an optical characteristic of an examined lens according to claim 17, wherein said predetermined range at said designated each position of a far viewing section and a near viewing section is displayed by said display means with marking; and said averaged power calculated by said calculating means is also displayed on said display means.

19. The apparatus for measuring an optical characteristic of an examined lens according to claim 12, wherein said display means displays a distribution of a spherical power and a cylinder power at each point of the lens in a manner of a color map.

* * * * *